US010583468B2

(12) United States Patent
Hagedorn et al.

(10) Patent No.: US 10,583,468 B2
(45) Date of Patent: Mar. 10, 2020

(54) METHOD FOR DELIVERING SAFETY AND DISPOSAL INSTRUCTIONS TO PERSONNEL WHO ARE REMOVING COATINGS WITH LASER PROCESSING

(71) Applicant: Surclean, Inc., Brighton, MI (US)

(72) Inventors: Kevin Hagedorn, Ann Arbor, MI (US); Donald Sprentall, South Lyon, MI (US)

(73) Assignee: Surclean, Inc., Brighton, MI (US)

( * ) Notice: Subject to any disclaimer, the term of this patent is extended or adjusted under 35 U.S.C. 154(b) by 350 days.

(21) Appl. No.: 15/069,036

(22) Filed: Mar. 14, 2016

(65) Prior Publication Data

US 2016/0263629 A1 Sep. 15, 2016

Related U.S. Application Data

(60) Provisional application No. 62/133,360, filed on Mar. 14, 2015.

(51) Int. Cl.
*B08B 7/00* (2006.01)
*B23K 26/03* (2006.01)
*B23K 26/362* (2014.01)
*B23K 26/352* (2014.01)
*B23K 26/08* (2014.01)
(Continued)

(52) U.S. Cl.
CPC ............ *B08B 7/0042* (2013.01); *B23K 26/03* (2013.01); *B23K 26/0622* (2015.10); *B23K 26/0884* (2013.01); *B23K 26/352* (2015.10); *B23K 26/361* (2015.10); *B23K 26/362* (2013.01); *B23K 37/006* (2013.01); *B23K 2101/34* (2018.08)

(58) Field of Classification Search
CPC .... B23K 26/03; B23K 26/032; B23K 26/362; B23K 26/352; B08B 7/0042
See application file for complete search history.

(56) References Cited

U.S. PATENT DOCUMENTS

2007/0296967 A1* 12/2007 Gupta ................... G01J 3/2889
356/318
2011/0017715 A1* 1/2011 Marcus ................ B23K 26/032
219/121.71
(Continued)

FOREIGN PATENT DOCUMENTS

JP 2007-322405 A * 12/2007
JP 2008-268067 A * 11/2008

OTHER PUBLICATIONS

Machine translation of Japan Patent document No. 2007-322,405-A, Jun. 2018.*

*Primary Examiner* — Geoffrey S Evans
(74) *Attorney, Agent, or Firm* — Harness, Dickey & Pierce, P.L.C.

(57) ABSTRACT

A laser coating removal system includes a detector and a controller. The detector detects wavelengths associated with radiative emission of elements in laser-induced plasma generated by the laser coating removal. The controller generates concentration data based on the wavelengths, the concentration data indicating concentration of the elements in the laser-induced plasma, and notifies a user of the laser coating removal system in response to concentration of one of the elements in the laser-induced plasma being greater than or equal to a predetermined threshold.

12 Claims, 3 Drawing Sheets

(51) Int. Cl.
*B23K 37/00* (2006.01)
*B23K 26/0622* (2014.01)
*B23K 26/361* (2014.01)
*B23K 101/34* (2006.01)

(56) References Cited

U.S. PATENT DOCUMENTS

| | | | | |
|---|---|---|---|---|
| 2011/0100967 | A1* | 5/2011 | Yoo | B23K 26/032 219/121.73 |
| 2012/0000893 | A1* | 1/2012 | Broude | B23K 26/032 219/121.69 |
| 2013/0062323 | A1* | 3/2013 | Hassan | G01N 21/718 219/121.62 |
| 2013/0153552 | A1* | 6/2013 | Jeong | B23K 26/032 219/121.69 |
| 2013/0277340 | A1* | 10/2013 | Liu | B23K 26/127 219/121.61 |

\* cited by examiner

METHOD FOR DELIVERING SAFETY AND DISPOSAL INSTRUCTIONS TO PERSONNEL WHO ARE REMOVING COATINGS WITH LASER PROCESSING

CROSS-REFERENCE TO RELATED APPLICATIONS

This application claims the benefit of U.S. Provisional Application No. 62/133,360, filed on Mar. 14, 2015. The entire disclosure of the application referenced above is incorporated herein by reference.

FIELD

This disclosure relates to laser processing and chemical waste disposal.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Laser processing is becoming a competitive alternative to media blasting and chemical solvents for stripping coatings from parts and vehicles. Examples of vehicles that need to have the paint periodically stripped and reapplied include aircraft and naval vessels. Removing paint from vehicles and metal parts is often done with solvents or media blasting. But solvents create excessive chemical waste, and media blasting can damage aluminum. However, lasers can remove individual coating layers without damaging the aluminum. Other applications for laser coating removal include mold cleaning, graffiti removal, and oxide removal from metal parts.

Laser-induced breakdown spectroscopy (LIBS) is used to determine the elemental composition of materials. In this technique, a laser is used to deliver enough energy to the surface of a material to ignite plasma. As the plasma cools, the composition of the material can be determined from the intensity of characteristic atomic emission lines.

SUMMARY

A method for delivering safety guidelines to personnel who may be involved with removing unknown coatings from vehicles or other parts with a laser coating removal system is disclosed. During laser removal of a coating, the atomic emission lines for toxic elements may be monitored with a broad band spectrometer or may be monitored with a series of photodiodes which measure emission at individual wavelengths or a small range of wavelengths, to determine if the toxic elements are present above a programmed threshold. If the toxic elements are present above a programmed threshold, the software can select the relevant text from a preprogrammed library and deliver the relevant text regarding waste handling and safety to the personnel operating the system.

The method also detects heavy elements in materials being processed with a laser coating removal system and using this information to direct laser processing. During laser removal of a coating, the atomic emission lines for elements in the coating may be monitored by a detector, where the detector is a device which can record light intensity as a function of wavelength and where examples include a broad band spectrometer or a series of photodiodes which measure emission at individual wavelengths or a small range of wavelengths. A calibration is done on the detector so that the signal intensity at different wavelengths corresponds to a metal concentration. These metal concentrations may then be used to determine when one layer has been removed and the layer underneath is being etched. For example, if a material has two layers and a particular element or elements are present in the bottom layer but not in the top layer then it can be determined when the bottom layer is being processed by the presence of those elements in the plasma. Alternatively, the atomic emission from a particular element or elements in the top layer disappearing may also indicate that the top layer has been removed. An example would be removing yttria stabilized zirconia from the surface of PtAl. In this example, when platinum appears in the spectra, the bottom layer is being processed. If it is desirable to avoid damaging the PtAl layer, then when Pt appears in the spectra, processing is stopped.

In sum, a method for delivering relevant waste disposal and safety information to operators of a laser surface cleaning apparatus is disclosed. The apparatus uses a detector, controller, and alert system to collect data on the plasma emission spectra created during ablation, convert the spectral data to elemental and composition data, and deliver the relevant safety and waste disposal guidelines to a user from a preprogrammed database. This apparatus can be used in conjunction with a laser cleaning system to remove unidentified coatings from vehicles, buildings, and parts safely and in accordance with waste disposal guidelines. The detector may further be used to aid in directing laser processing by monitoring the composition of the material being removed.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Figure 1:
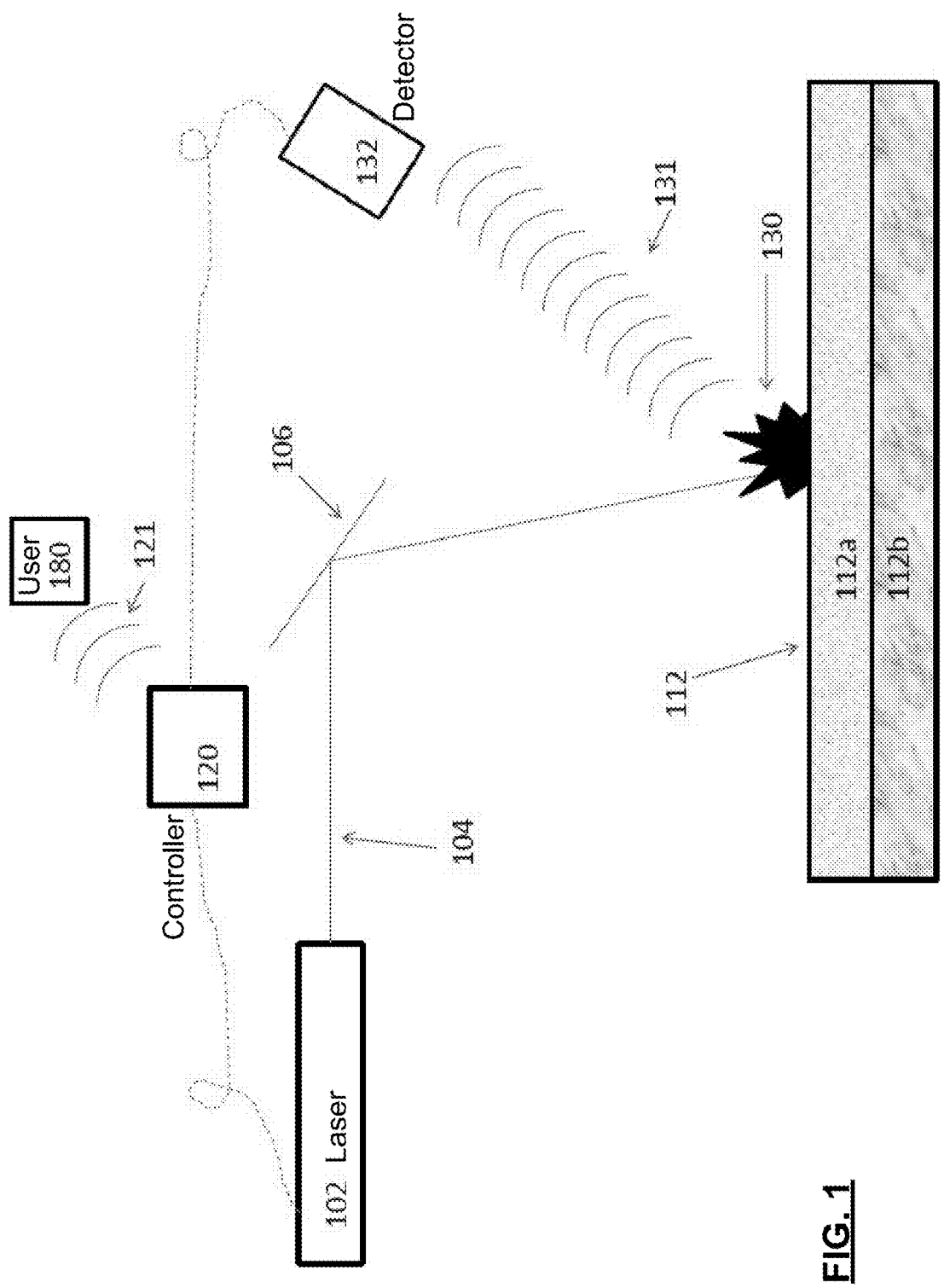
FIG. 1 is a schematic of a system for monitoring the presence of toxic elements in coatings.

Laser removal of coatings is becoming more common because high brightness laser diodes have reduced the cost of high power lasers so that bulk surface treatment applications have become more affordable. As laser surface treatments become more common, it is desirable to be able to identify heavy metals in coatings so that workers can take appropriate safety measures, the waste can be disposed of properly, or the process can be stopped after a particular coating is removed.

Unlike media blasting and chemical etching with solvents, laser coating removal may be easy to automate and program and can produce less waste. As the laser etches the coating, some part of the material may be heated to plasma. As the atoms in the plasma cool, atomic emission occurs at characteristic wavelengths. For example, there is a platinum emission peak at 214.42 nm. These emission peaks may be monitored to report on the composition of the material being removed. This data may be useful in notifying workers of safety hazards if the metal is carcinogenic, or this data may be useful in stopping or slowing laser processing when one layer is removed and the next layer is being processed. For example, if there are three layers including a substrate, a primer, and a top coat, the top coat can be removed while leaving the primer undamaged by stopping the coating removal process when certain elements are detected.

As laser coating removal becomes more common, systems can be configured to alert users to potential health hazards and suggests disposal instructions. For example, many older structures, like bridges, have been painted over many times and older coats may still contain lead. Furthermore, many primers on old vehicles and naval ships may contain a particularly carcinogenic form of chromium called hexavalent chrome. Users should be notified if they reach a section of the structure or metal part where the coating contains carcinogenic metals. Furthermore, workers removing unknown coatings from derelict structures and vehicles may be inadvertently exposed to carcinogenic heavy metals if limited data on the coatings is available.

One aspect of the present invention is a method for identifying toxic metals in an unknown coating by monitoring wavelengths associated with radiative emission of those elements in laser induced plasma. Most metals pose significant health risks at high concentrations, some metals like mercury, arsenic, beryllium, cadmium, lead, and chromium are health risks even at very low concentrations. In this method, wavelengths associated with atomic emission of metals in laser induced plasma at the material surface are monitored by a detector to determine the composition of the waste ash. The detector can be a broadband spectrometer, a scanning monochromatic spectrometer, or one or more photodiodes which monitor a single or multiple wavelengths and may use light filters. For example, Cd and Pb have atomic emission lines at 214 nm and 220 nm, respectively. An example of the detector would be a broad band spectrometer that monitors the light intensity at 214 nm and 220 nm simultaneously or a photodiode with a bandpass filter placed in front of it such that only 214 nm, 220 nm, or 214 nm and 220 nm light is detected.

There may be background radiation at the wavelengths of interest due to blackbody radiation of the plasma that may be compensated for by calibrating the system. The intensity data may be converted to concentration data by software which uses this calibration. For example, a photodiode with a 214 nm bandpass filter placed in front of it, which allows 214 nm light to pass the filter and may allow a range from 214±5 nm to pass the filter, which would generate a voltage in the photodiode depending on the amount of light incident on the detector. For example, a voltage of 1V may indicate a low concentration of Cd, and a voltage of 10V may indicate a high concentration of Cd. The system may be calibrated empirically so that each of the voltages reports a concentration. For example, 1V may be background and may correspond to a concentration of 0 ppm Cd, and 10V may correspond to a concentration of 100 ppm Cd in the waste ash.

Another aspect of the disclosed invention is a method for quickly delivering relevant information to workers using data collected by the detector. In this aspect of the invention, a library of safety instructions and waste disposal guidelines are programmed into the system. The appropriate guidelines are called and displayed to the user based the concentration of metals as calculated from the wavelengths being monitored by the detector. For example, the software may convert the intensity of the radiative emission to a metal mass concentration. For example, the threshold for mercury may be set to 1 microgram, and the threshold for cobalt may be set to 100 micrograms. Further, during the cleaning process, radiative emission from mercury atoms may be detected in the plasma which has been previously determined to correspond to a concentration of mercury above 1 ppm. Then the software interrupts the cleaning process and pulls relevant safety information from a preprogrammed database which notifies the user of the health hazards posed by mercury and suggests safety guidelines for mercury at the detected concentration. Similarly, the software also pulls disposal instructions for the waste ash from the database.

One aspect of the present invention is a method for identifying when one coating has been completely removed and another layer is being processed by monitoring wavelengths associated with radiative emission of specific elements in laser induced plasma. In this method, wavelengths associated with atomic emission of metals in laser induced plasma are monitored by a detector to determine the composition of the waste ash. The detector can be a broadband spectrometer, a scanning monochromatic spectrometer, or one or more photodiodes which monitor a single or multiple wavelengths using light filters. The emission at a particular wavelength is correlated to the concentration of a metal. When the concentration of a metal changes, for example from being present to absent, this can be used to indicate that a coating layer has changed, in which case the laser is directed to process a different area or stop processing. For example, if emission at 214.42 nm is being monitored and this emission is reduced, this may indicate that processing of one coating is complete, and the laser coating removal system might be directed to stop etching that area.

FIG. 1 shows a system 100 for collecting compositional information on a coating being removed by laser processing. The system 100 includes a laser 102 that emits a pulsed or continuous laser beam 104 under the control of a controller 120. The laser 102 can be an Ytterbium fiber laser, for example, but may also be YAG or $CO_2$ laser. The controller 120 can be a computing device having a CPU and memory, the CPU operative to execute instructions stored in the memory to direct the system 100 and to collect and interpret data and may deliver relevant information to the user 180 based on the results.

The laser beam 104 can be directed to a specimen 112 by laser optics 106. For example, the laser optics 106 can include beam and pulse shaping optics that shape laser beam pulses temporally and spatially to direct the pulsed laser beam 104 to a focal point at or near the surface of the specimen 112. The laser optics 106 may also include a scanner. The specimen 112 can be comprised of more than one material, for example, a coating 112a over a substrate 112b. The pulsed laser beam 504 creates plasma 130 when removing the coating material 112a from the substrate 112b. The material which composes the hot plasma emits radiation 131 which is detected by a detector 132. The controller 120 analyses the data from the detector 132 and delivers the relevant safety and waste disposal data to the user 180 if the preprogrammed conditions for doing so are met.

Figure 2:
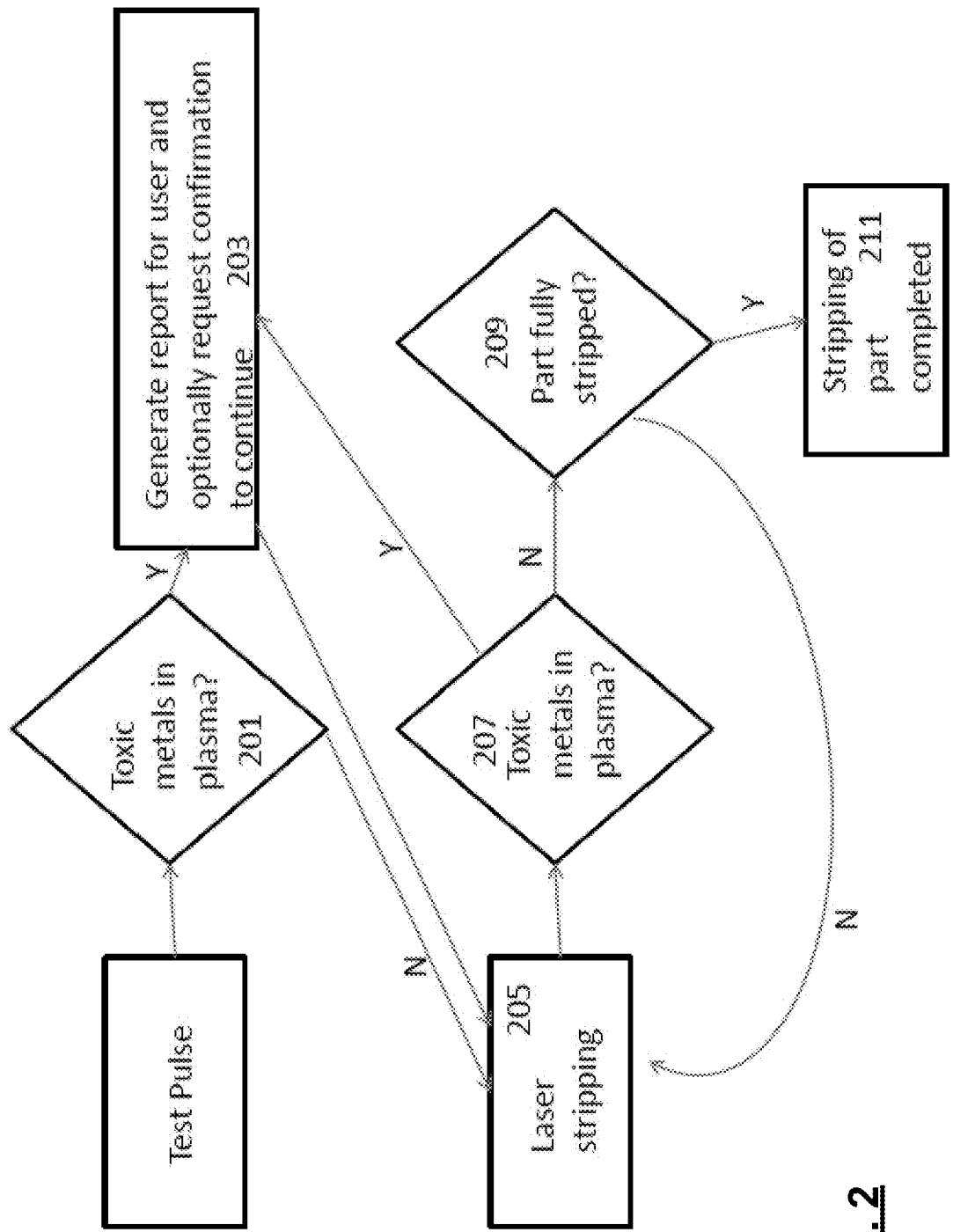
FIG. 2 is a flowchart of a process for using data generated by the system illustrated in FIG. 1 to display relevant safety information to an operator of a laser coating removal system.

Aspects of disclosed implementations provide for the delivery of safety and waste disposal documentation to laser processing technicians. FIG. 2 is a flowchart of a process 200 for delivering the relevant information. Implementations of this disclosure may change the order of execution of steps of FIG. 2 without departing from the meaning and intent of this disclosure. At 201, the process 200 ablates a small amount of material and interprets the data from the detector to determine if there is a significant amount of dangerous materials (e.g., greater than or equal to a predetermined threshold amount) in the coating to be removed. If there are no toxic materials in the coating (e.g., less than the predetermined threshold amount), the process proceeds to 205. However, if there are toxic materials (e.g., greater than or equal to the predetermined threshold amount), the system first notifies the user and optionally asks for confirmation before proceeding at 203. As the laser is scanned across the surface and the coating is removed at 205, the detector continuously collects data on the radiative emission from the plasma, and the computer determines if the data indicates the presence of toxic materials at 207 (e.g., greater than or equal to the predetermined threshold amount). If toxic materials are detected at any point during the process, then the software notifies the user and optionally requests confirmation before continuing at 203. This loop continues until the part is fully stripped at 209 and the process terminates at 211. The frequency of monitoring the plasma may vary. For example, the plasma may only be examined once at the beginning of the process at 201, and loops between 205 and 207 may occur at a frequency between 0.01 Hz and 1 THz.

Figure 3:
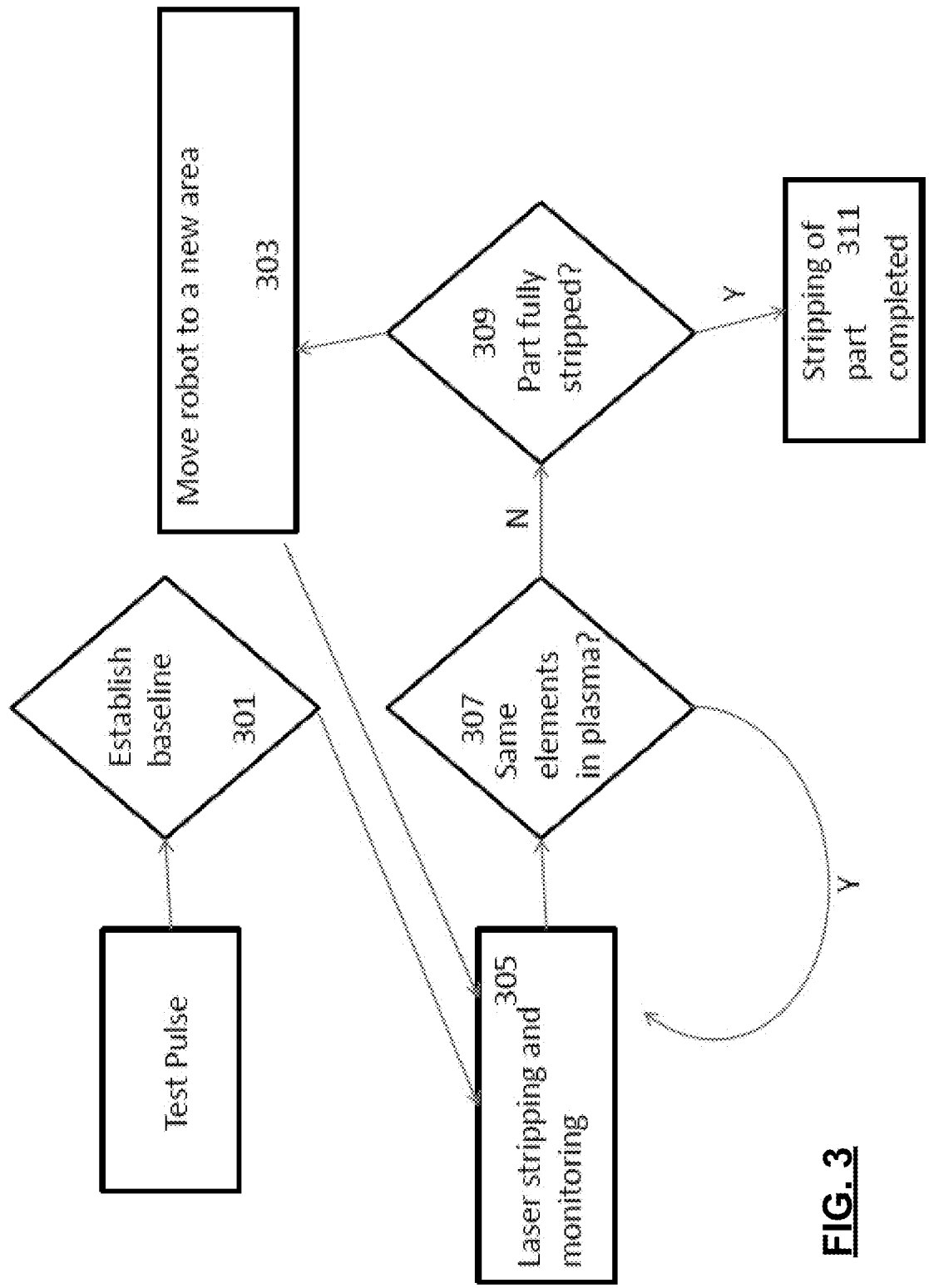
FIG. 3 is a flowchart of a process for using data generated by the system illustrated in FIG. 1 to control the laser coating removal system based on detection of elements.

Aspects of disclosed implementations provide for directing a coating removal process. FIG. 3 is a flowchart of a process 300 for directing a laser process. Implementations of this disclosure may change the order of execution of steps of FIG. 3 without departing from the meaning and intent of this disclosure. The system may ablate material and measure the light intensity at different wavelengths to establish a baseline at 301. Once the baseline is established, the process 300 proceeds to 305. As the laser is scanned across the surface and the coating is removed at 305, the detector continuously collects data on the radiative emission from the plasma, and the computer determines the elemental composition at 307. If the elemental composition changes, then a new area is processed at 303. This loop continues until the part is fully stripped at 309 and the process terminates at 311. The frequency of monitoring the plasma may vary. For example, the plasma may only be examined once at the beginning of the process at 301, and loops between 305 and 307 may occur with a frequency between 0.01 Hz and 1 THz.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. A laser coating removal system comprising:
   a detector in the form of a spectrometer or one or more photodiodes to detect wavelengths associated with radiative emission of elements in a laser-induced plasma;
   a controller to generate concentration data based on the wavelengths, the concentration data indicating concentration of the elements in the laser-induced plasma, and to notify a user of the laser coating removal system in response to detection of a concentration of one of the elements in the laser-induced plasma being greater than or equal to a predetermined threshold; and
   a laser to emit a pulsed or continuous laser beam under the control of the controller to generate the laser-induced plasma,
   wherein the controller stops operation of the laser in response to the concentration of the one of the elements in the laser-induced plasma being greater than or equal to the predetermined threshold, and continues operation of the laser in response to confirmation from the user that it is acceptable to continue operation of the system.

2. The laser coating removal system of claim 1 wherein the predetermined threshold is based on toxicity of the one of the elements in the laser-induced plasma.

3. The laser coating removal system of claim 1, wherein upon detection of a concentration of one of the elements in the laser-induced plasma being greater than or equal to a predetermined threshold, a notification of such detection is sent to the user.

4. The laser coating removal system of claim 3, wherein the notification includes one or more of health hazards posed by the one of the elements in the laser-induced plasma, safety instructions regarding the one of the elements in the laser-induced plasma, and instructions to dispose waste ash generated by the laser coating removal system.

5. The laser coating removal system of claim 3, wherein the notification includes one or more of audio, visual, or both modes of notifications.

6. The laser coating removal system of claim 3, wherein the notification is based on one or more of safety and disposal guidelines stored in the controller.

7. The laser coating removal system of claim 1 wherein the detector is calibrated to compensate for background radiation at the wavelengths associated with the radiative emission of the elements in the laser-induced plasma.

8. The laser coating removal system of claim 1 wherein the detector records light intensity associated with the radiative emission as a function of wavelength.

9. The laser coating removal system of claim 1 wherein the detector is calibrated so that light intensity at different wavelengths corresponds to a concentration of one of the elements.

10. The laser coating removal system of claim 1 wherein the controller identifies when removal of one layer of coating is complete and removal of another layer begins based on the wavelengths associated with the radiative emission of the elements in the laser-induced plasma.

11. The laser coating removal system of claim 1 wherein the controller identifies when removal of one layer of coating is complete and (i) begins removal of another layer or (ii) stops the laser coating removal system based on the wavelengths associated with the radiative emission of the elements in the laser-induced plasma.

12. The laser coating removal system of claim 1 wherein the controller correlates one of the wavelengths associated with the radiative emission to a concentration of one of the elements in the laser-induced plasma, and indicates a change of layer of coating based on a change in the concentration.

* * * * *